Patented Sept. 4, 1928.

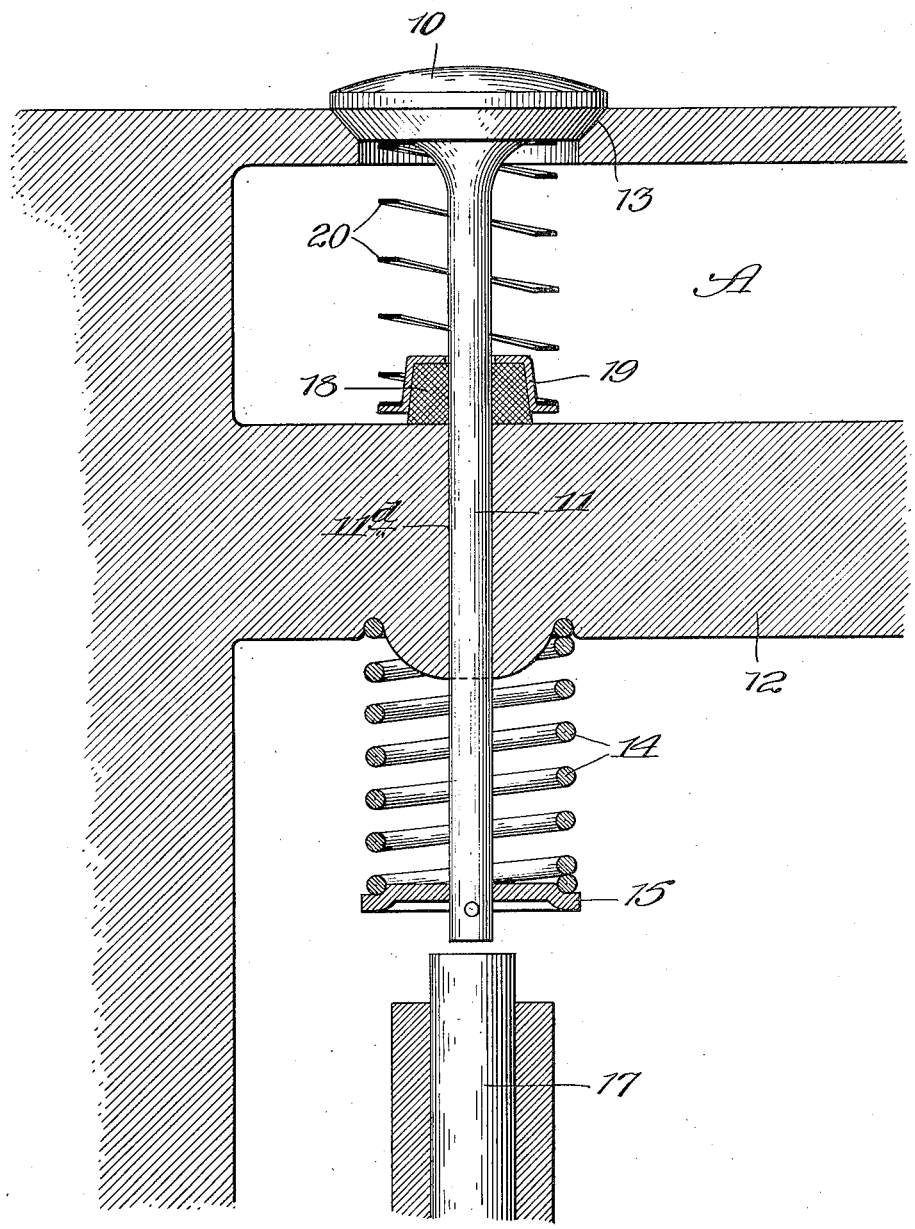

1,683,293

UNITED STATES PATENT OFFICE.

ALBERT C. LINDBLOOM, OF CHICAGO, ILLINOIS.

PACKING DEVICE FOR VALVE STEMS.

Application filed December 19, 1923. Serial No. 681,515.

This invention relates to packing devices for valve stems of automobiles and the like, and is an improvement on my Patent No. 1,470,276, granted October 9, 1923, and is fully described in the following specification and shown in the accompanying drawing, in which the figure shows a longitudinal section through a valve stem having the invention mounted thereon.
The embodiment is illustrated in connection with a valve 10 having a valve stem 11 slidably mounted in the casting 12 and held upon its seat 13 by means of a spring 14, which is secured in a well known manner to the lower part of the stem by means of the washer 15 and pin 16.

This valve is raised in any well known manner as by means of the valve tappet 17, which is periodically raised by means of a cam shaft, not shown. It will be understood that the foregoing is well known practice in automobile construction.

In the case of the inlet valve, the passage A is under a greater or less degree of vacuum and when the engine is new the valve stem 11 fits its guide fairly snugly so that only a small amount of air is permitted to leak therearound. As the engine is used, however, both the valve stem 11 and the hole 11ª, in which it is guided, wear and as this wear increases the amount of air drawn into the passage A, around the valve stem 11, eventually becomes sufficient to disturb the mixture of air and fuel reaching the engine and cylinder.

I have overcome this trouble by removing the valve stem 10 and placing thereon a pad of yieldable material 18, such as felt or asbestos, together with a washer 19, which is preferably made concaved or conical on its inner surface and which is pressed down upon the material 18 by a spring 20, which is sufficiently stiff to maintain a pressure upon the washer 19 at all operative positions of the valve 10 but which is a much weaker spring than the valve spring 14, so that it is unable to raise the valve against the action of the spring 14.

The compression of the felt-like material 18 squeezes it about the valve stem 11 so as to greatly retard the tendency for air to flow around the valve stem. This action is increased by making the inner face of the washer 19 concaved or conical.
In some engines on which it is desirable to install this device, the space between the bottom of the valve and the upper end of the guide is small thereby permitting only a short spring. To overcome this objection and to improve the operation of the device, I have employed a conical or cup-shaped washer 19 made from flat sheet metal and, when the cup-shaped washer is in an inverted position, having a rim 19ª at its lower end upon which the spring rests; this spring too has a flat cross-section which gives greater flexibility for a given length of spring. The spring is capable of being collapsed so as to be substantially the length of said washer, whereby it is adapted to accommodate valve guides of varying height.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:

1. In combination, an internal combustion engine, having a valve guide, a valve having a stem slidable in said guide, a spring for normally holding said valve on its seat, packing surrounding said stem and located within the intake passage of the engine, a cup-like washer around said packing, a flange at the lower edge of said washer, and a helical spring of flat cross-section partly enclosing said washer and bearing against said flange to press said packing against the guide, the spring when collapsed being substantially the length of said washer whereby it will accommodate valve guides of varying height.

2. A valve-rod packing, comprising a packing disc of yieldable material centrally apertured for the passage of a valve stem, a sheet metal washer of inverted cup shape having a flat centrally apertured top wall and a downwardly flaring circumferential wall bearing respectively on the upper side and periphery of said disc, said washer formed on its lower end with an annular spring seat, and a coil spring having a lower flat coil seated in said seat.

3. A valve-rod packing, comprising a packing disc of compressible material centrally apertured to fit a valve stem, a sheet metal washer of inverted cup shape having a flat top wall formed with a central aperture of greater diameter than the aperture of the packing disc and a downwardly flaring circumferential wall bearing respectively on the upper side and periphery of said disc, said washer formed on its lower end with an annular spring seat, and a coil spring having on its lower end a flat coil seated in said seat and on its upper end a flat coil adapted to bear on the under side of the valve.

ALBERT C. LINDBLOOM.